(No Model.)
W. M. FINK.
GALVANIC BATTERY.
No. 434,593. Patented Aug. 19, 1890.
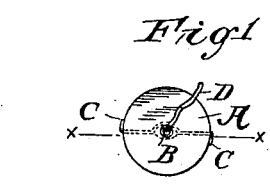
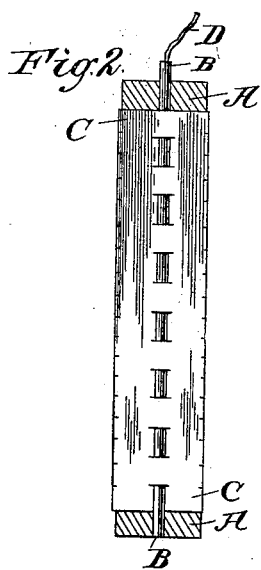
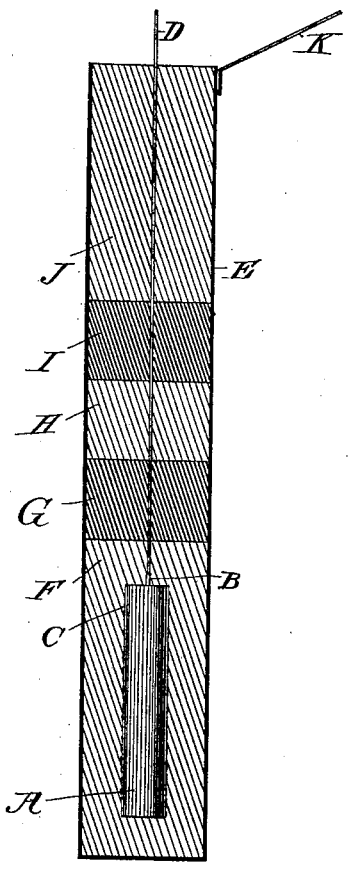
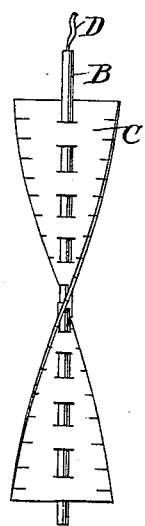
Attest:
C W Benjamin
Inventor:
William M. Fink
by his Attorney
Philip Hathaway.

UNITED STATES PATENT OFFICE.

WILLIAM M. FINK, OF ELIZABETH, ASSIGNOR OF TWO-THIRDS TO SHERMAN COOPER AND PHILIP HATHAWAY, BOTH OF WESTFIELD, NEW JERSEY.

GALVANIC BATTERY.

SPECIFICATION forming part of Letters Patent No. 434,593, dated August 19, 1890.

Application filed March 19, 1890. Serial No. 344,578. (No model.)

*To all whom it may concern:*

Be it known that I, WILLIAM M. FINK, a citizen of the United States, and a resident of Elizabeth, in the county of Union and State of New Jersey, have invented certain new and useful Improvements in Electrical Batteries, of which the following is a specification.

My invention relates to that class of batteries in which the negative element is composed of chloride of silver and the positive element of zinc, and usually known as "chloride-of-silver batteries," and the nature of such invention is shown by the following description of the mode in which I construct my improved battery.

I make the zinc electrode of the battery in the form of an elongated hollow vessel, using, by preference, the cylindrical or tubular form as usually most convenient, such vessel or tube being closed at the lower end and open at the top. This zinc tube not only forms in my improved battery the zinc electrode, but also is used as the receiving-vessel for the chloride-of-silver electrode with the exciting-fluid and packing, as hereinafter described. For the negative electrode of the battery I use a rod of chloride of silver, which I construct in the following manner: The chloride of silver is melted and cast in a mold in the form of a rod, round a longitudinal axis formed by a piece of silver wire placed in the center of the mold. Before placing this central wire on the mold I attach thereto a piece of silver-foil of a length slightly exceeding the length of the mold and of a width rather greater than the width of the mold, such foil being slit at the edges, so as to form a series of flaps or projections, which, when the wire is placed in the mold, will be doubled back against the sides or interior circumference of the mold, and will consequently, when the melted chloride of silver is poured into the mold, arrange themselves in various directions around the surface of the rod of chloride of silver formed by the mold and be impacted on such surface. In practice I find it desirable to give the central wire, after the foil is attached thereto, a slight twist, so that the projecting ends of the foil may assume a spiral form around the interior circumference of the mold; or I attach small transverse silver wires to the central wire and allow the same to project to a width slightly exceeding the diameter of the mold, so that the ends of such transverse wires shall be doubled back against the interior circumference of the mold, or I attach to such central wire a strip of thin silver-wire gauze slightly exceeding in the same way the diameter of the mold, the object in each case being to bring the electric current as far as possible into close contact by means of the metallic silver, in the form of foil, wire, or gauze, with every part of the chloride-of-silver rod, and especially with its central parts. By the adoption of this device I have been enabled to remove the principal objection which has hitherto been found in the use of chloride-of-silver batteries, which is that, owing to the fact that chloride of silver is a bad conductor, such batteries are very slow in starting and their initial force very small, for which reason they have been found to be wholly inapplicable for use with bells or annunciators where instant action is needed. In a battery constructed in my improved method it will be found that the electrical action starts the instant that the circuit is closed, and that the full force of the battery is exerted at once—a result which has never hitherto been attained. I am aware that in some chloride-of-silver batteries attempts have been made to remedy this well-known defect by winding silver wire on the external surface of the chloride of silver; but such a device does not effect any complete and sufficient communication throughout the whole body of the chloride-of-silver rod, and especially with its central portions, and they have failed, therefore, adequately to remedy such defect. The zinc tube and the chloride-of-silver rod being thus prepared, I proceed as follows:

I take a suitable vehicle—such as plaster of-paris—capable of setting and forming when set a dry porous mass, using, preferentially, plaster-of-paris mixed with filtering-paper reduced to pulp, or with absorbent cotton wool, which I mix with water and any suitable exciting medium till it is of the consistency of thick cream, and I fill about two-fifths of the zinc tube with such vehicle. I then take the rod of chloride of silver having a conducting silver wire of suitable length attached to the central wire of the rod, and after wrapping the chloride-of-silver rod with a piece of tissue-paper well moistened with the exciting-fluid I plunge it into the center of the plaster or compound before described, taking care that every part of the rod is equidistant from the surrounding zinc, and that there is no contact at any part, and I then leave the plaster or compound to set. To facilitate the insertion of the rod and to insure against the possibility of any contact at the bottom of the zinc tube, where, if anywhere, contact would be most likely to take place if great care were not exercised, I find it convenient to insert at the bottom of such zinc tube a small rubber washer before pouring in the plaster-of-paris. When the plaster is set, I pack around the top of such plaster a layer of dry fibrous or porous material capable of readily absorbing moisture, using, preferentially, for this purpose absorbent cotton wool. Above such wool or other dry absorbent packing I insert a layer or a seal of wax, paraffine, or other suitable cement, preferentially using a cement made of equal parts of beeswax, rosin, and asphaltum. On this seal I superimpose a layer of dry plaster-of-paris or other similar absorbent substance, and over this another thick layer or seal of the wax or cement before described. The approximate relative thickness of these various layers is shown in the drawings hereinafter referred to and annexed to this specification. I then attach a wire in the usual way to the upper portion of the zinc tube, and the battery is complete and ready for use. It may then be placed in any suitable case.

For the better understanding of my invention I have annexed to this specification a drawing explanatory of the same, in which—

Figure 1 is a plan view of the chloride-of-silver rod. Fig. 2 is a sectional view of Fig. 1 on the line $xx$. Fig. 3 is a view of the silver-foil forming part of the chloride-of-silver rod in a spiral form. Fig. 4 is a longitudinal section of the entire battery.

In the above drawings, A is the chloride of silver; B, the central wire or axis of the chloride-of-silver rod; C, the silver-foil; D, the conducting-wire; E, the zinc tube or containing-vessel; F, the porous filling holding the exciting agent; G, the absorbent cotton packing; H, the wax or cement; I, the dry plaster-of-paris; J, the upper seal or packing of wax or cement, and K the conducting-wire attached to the zinc tube E.

Having thus described the nature of my improvements, what I claim as my invention is—

1. The chloride-of-silver rod A, with central wire B, having attached thereto the silver-foil C or other metallic connections in the shape of transverse silver wires or silver-wire gauze, as described, such foil or other connections being so constructed as to fold over at their points on the surface of the chloride of silver, and to afford complete electrical communication between such surface and the interior portions of the rod.

2. In an electric battery, the combination of a zinc vessel containing the negative electrode and the exciting agent and seal of such battery, and also forming the positive electrode of the battery, a chloride-of-silver rod forming the negative electrode, and a dry porous packing or filling containing the exciting agent, such porous packing or filling being composed of plaster-of-paris mixed with comminuted filtering paper or cotton, wool, or other similar porous fibrous material, all substantially as described.

3. In an electric battery, the combination of a zinc electrode forming the receiving-vessel for the other elements of the battery, a chloride-of-silver rod forming the negative electrode, a dry porous packing or filling containing the exciting agent, and a seal for the battery composed of one or more layers of dry absorbent material alternated with one or more layers of wax or cementing material.

4. In an electric battery, the combination of a zinc vessel forming the positive electrode of the battery, and also holding the other elements of such battery, a chloride-of-silver rod forming the negative electrode, a silver conducting medium embedded in such chloride-of-silver rod, a dry porous packing holding the exciting medium, and a seal composed of alternate layers of dry absorbing material and wax or cement, as described.

In testimony whereof I have hereunto set my hand in the presence of two subscribing witnesses.

WILLIAM M. FINK.

Witnesses:
BENJAMIN M. OGDEN,
W. A. MORRELL.